July 12, 1949.  G. H. TOWNSEND  2,476,006
FISH LURE
Filed Aug. 6, 1947  2 Sheets-Sheet 1
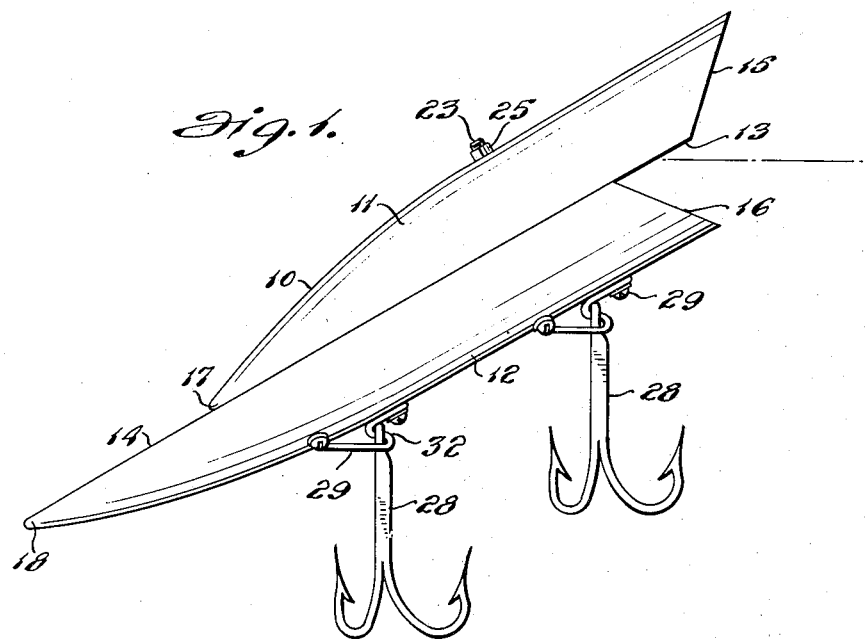
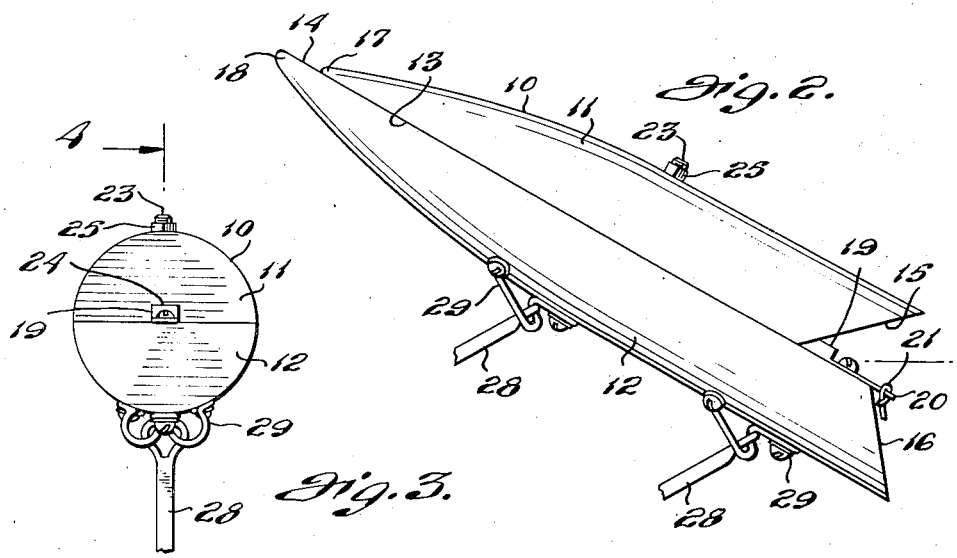
INVENTOR.
GEORGE H. TOWNSEND
BY Clark & Ott
ATTORNEYS July 12, 1949.　　　　G. H. TOWNSEND　　　　2,476,006
FISH LURE Filed Aug. 6, 1947　　　　　　　　　　　2 Sheets-Sheet 2

INVENTOR.
GEORGE H. TOWNSEND
BY
Clark & Ott
ATTORNEYS

Patented July 12, 1949

2,476,006

UNITED STATES PATENT OFFICE 2,476,006

FISH LURE

George H. Townsend, Laurel, N. Y.

Application August 6, 1947, Serial No. 766,591

4 Claims. (Cl. 43—42.22)

This invention relates to a fish lure used in trolling or casting.

The invention comprehends a fish lure which is so constructed and arranged that the same may be set either to travel upon the surface of the water or under the water when trolling or casting in moving or in still water.

Another object of the invention is the provision of a lure composed of adjustably associated sections which may be set for producing a planing action when drawn through the water to thereby cause the same to travel at various depths below the surface thereof or on the surface of the water in accordance with the relative setting of the sections.

Still another object of the invention is the provision of a fish lure composed of superimposed longitudinally aligned sections which are longitudinally adjustable relative to each other for exposing the confronting surfaces of either of said sections for producing a planing action when drawn through the water for regulating the depth at which the lure travels through the water when trolling or casting.

The invention has for a further object the provision of angulated forward ends for producing a quick acting lure or plug having sidewise pivotal or swinging movement when drawn through the water.

With the foregoing and other objects in view, reference is now made to the following specification and accompanying drawings in which the preferred embodiment of the invention is illustrated.

In the drawings:

Fig. 1 is a side view of a fish lure constructed in accordance with the invention and illustrating the same with the upper section arranged forwardly of the lower section.

Fig. 2 is a similar view with parts broken away and illustrating the lower section arranged forwardly of the upper section.

Fig. 3 is a forward end view taken of Fig. 1.

Figure 4:
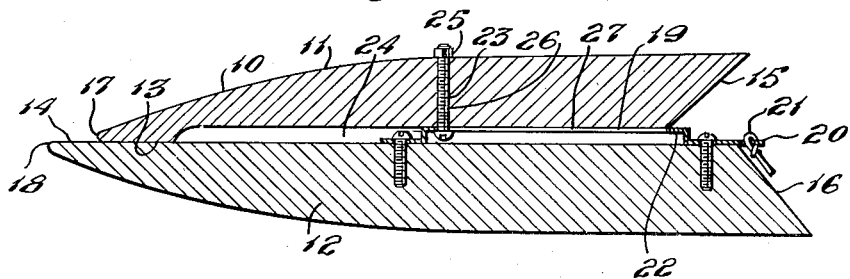
Fig. 4 is a longitudinal medial sectional view through the fish lure.
Figure 5:
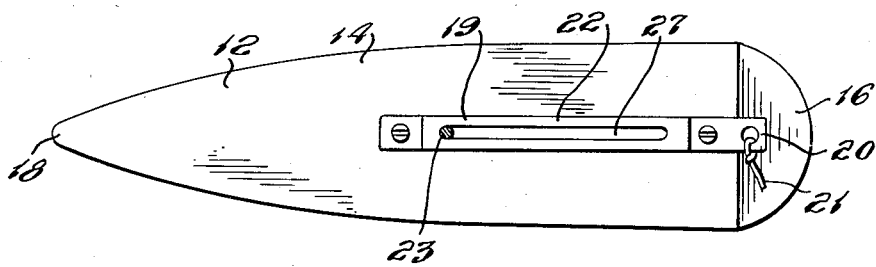
Fig. 5 is a top plan view of the lower section.
Figure 6:
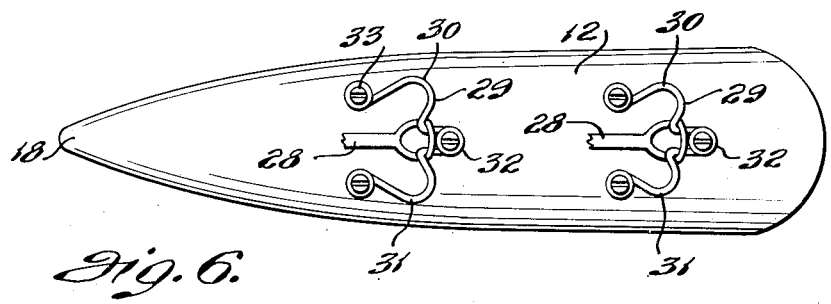
Fig. 6 is a bottom plan view thereof.

Referring to the drawings by characters of reference, the fish lure consists of an elongated body 10 which may be fashioned of metal or other heavy material so as to produce a lure which will normally sink when at rest, or the same may be fashioned of wood or other light material so as to produce a lure which will normally float when casting or trolling either in still or moving water.

The body 10 is composed of upper and lower longitudinally extending sections 11 and 12 which are of semi-circular formation in cross-sectional configuration and have confronting faces 13 and 14 extending longitudinally of the body 10 substantially medially thereof. The sections are formed with large forward portions and with forward ends 15 and 16 extending inwardly and rearwardly in angulated relation from the outer peripheries of the sections respectively to the confronting faces 13 and 14 thereof, the forward end 16 of the lower section 12 being located at a sharper angle to a horizontal plane extending between the sections coincident with the faces 13 and 14 than the forward end 15 of the upper section. From the forward portions the sections taper rearwardly to provide longitudinally bowed outer peripheries which terminate in blunt points or ends 17 and 18 respectively.

The sections are connected together to permit of relative longitudinal adjustment so as to dispose the upper section forwardly of the lower section or the lower section forwardly of the upper section. For this purpose the lower section is provided with a guide member 19 secured to the upper face 14 medially thereof and which extends longitudinally of the section with the forward apertured end 20 protruding beyond the angulated forward face 16 to thereby provide means for attaching the lure to a fish line indicated by the reference character 21. The guide member 19 is of inverted channel shaped formation in cross-sectional configuration and is formed with a slotted top wall 22 through which the threaded shank of a screw 23 slidably protrudes with the head thereof disposed beneath the top wall 22 and arranged for longitudinal sliding movement within the channel. The upper section 11 is formed with a longitudinally extending groove 24 which opens through the lower face 13 and the forward end 15 thereof and into which is fitted the guide member 19 with the screw 23 protruding upwardly through an aperture 26 in the upper section 11, the protruding end of the screw being threadedly engaged by a thumb nut 25 for adjustably connecting the sections together in associated relation.

The slot 27 in the top wall 22 of the guide member 19 and the groove 24 in the upper section 11 are of sufficient lengths to permit of the sliding of the upper section 11 to dispose the forward end thereof in forwardly projecting relation with reference to the lower section 12 as indicated in Fig. 1 of the drawings. When the sections are so arranged the longitudinal axis of the lure will be inclined forwardly as indicated in Fig. 1 of the drawings so that the lower face 13 of the upper section forwardly of the lower section will have a planing action against the water whereby the lure will travel upwardly through the water until it reaches the surface thereof and will then travel on the surface of the water. The upper section 11 may be adjusted so that the forward end of the lower section 12 projects beyond the upper section and when the sections are so arranged the longitudinal axis of the lure will be inclined rearwardly as indicated in Fig. 2 of the drawings so that the upper face 14 thereof forwardly of the upper section 11 will have a planing action when moving through the water in trolling or casting so as to cause the lure to dive and to travel through the water at a relative great depth. Setting of the sections at intermediate positions between the maximum forward and maximum rear positions thereof will effect movement of the lure at any desired depth below the surface of the water.

The lure is provided with longitudinally spaced fish hooks 28 which are secured in depending relation from the under side of the lower section 12. In order to prevent the barbs of the forward and rear hooks from becoming interlocked and from hooking onto the lower section, the hooks are each fastened to an attaching member 29 secured to the lower section 12 for limiting the swinging movement of the hooks. The attaching members 29 may be of any desired construction and which as illustrated consist of bowed spider arms 30 and 31 projecting outwardly and rearwardly from a forwardly extending medial arm 32 which latter arm extends through the eye of the hook with the shank of the hook depending between the outwardly extending arms 30 and 31. By this construction the spider arms 30 and 31 retain the hooks in depending rearwardly projecting relation and permit of limited sidewise movement thereof.

What is claimed is:

1. In a fish lure, an elongated body consisting of upper and lower longitudinally extending sections having inner faces disposed in confronting relation and extending longitudinally of and substantially medially of the body, means adjustably connecting said sections together and permitting relative longitudinal movement thereof to dispose either of said sections in forwardly projecting relation with reference to the other section so as to expose the forward portion of the inner face of the forwardly projecting section, and a hook attached to and depending from the lower section.

2. In a fish lure, an elongated body consisting of upper and lower longitudinally extending sections having inner faces disposed in confronting relation, said sections being adjustable relative to each other to permit of longitudinal movement thereof to dispose either of said sections in projecting relation forwardly of the other section so as to expose the forward portion of the inner face of the projecting section, means securing said sections together in fixed adjusted relation, and a hook attached to and depending from the lower section.

3. In a fish lure, an elongated body consisting of upper and lower longitudinally extending sections having inner faces disposed in confronting relation, said sections being adjustable relative to each other to dispose either of said sections in longitudinally projecting relation with reference to the other section to thereby expose a portion of the inner face of the projecting section, means securing said sections together in fixed adjusted relation, and a hook attached to and depending from one of the sections.

4. In a fish lure, an elongated body consisting of upper and lower longitudinally extending sections having inner faces disposed in confronting relation, said sections having angulated forward ends extending inwardly and rearwardly from the outer peripheries thereof to the confronting inner faces respectively and said sections being adjustable relative to each other to permit of longitudinal movement thereof to dispose either of said sections in projecting relation forwardly of the other section so as to expose the forward portion of the inner face of the projecting section, means securing said sections together in fixed adjusted relation, and a hook attached to and depending from the lower section.

GEORGE H. TOWNSEND.

REFERENCES CITED

The following references are of record in the file of this patent:

UNITED STATES PATENTS

| Number | Name | Date |
|---|---|---|
| 1,951,626 | Pashley | Mar. 20, 1934 |
| 2,184,792 | Clarke | Dec. 26, 1939 |
| 2,406,252 | Potter | Aug. 20, 1946 |